A. T. PICKENS.
PAD FOR ATTACHING VALVES TO TIRES.
APPLICATION FILED DEC. 15, 1920.
1,376,970. Patented May 3, 1921.
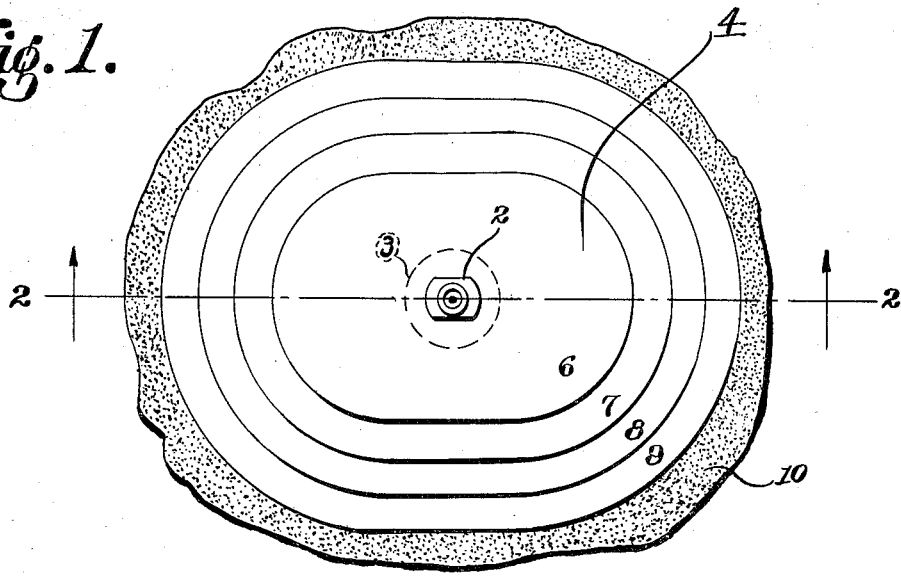
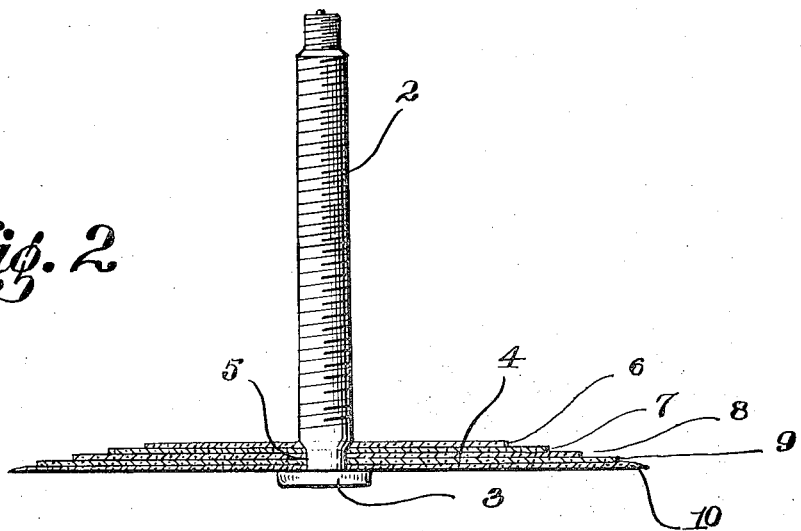
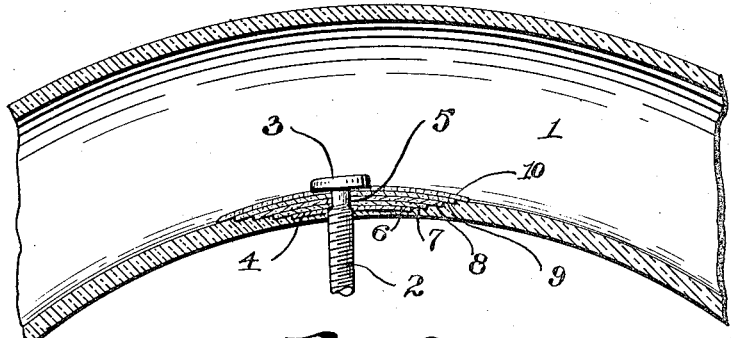
Inventor:
Andrew T. Pickens,
By Hugh N. Wagner,
Atty.

UNITED STATES PATENT OFFICE.

ANDREW T. PICKENS, OF ST. LOUIS, MISSOURI.

PAD FOR ATTACHING VALVES TO TIRES.

1,376,970.            Specification of Letters Patent.     Patented May 3, 1921.

Application filed December 15, 1920. Serial No. 430,951.

*To all whom it may concern:*

Be it known that I, ANDREW T. PICKENS, a citizen of the United States, residing at the city of St. Louis, in the State of Missouri, have invented certain new and useful Improvements in Pads for Attaching Valves to Tires, of which the following is a specification.

This invention relates to means for attaching the air valve in place in a pneumatic tube for tires or in air-bags used as forms in the construction of tires.

In the past great losses to manufacturers have been caused by air valves pulling through the rubber.

In the accompanying drawings forming part of this specification, in which like numbers of reference denote like parts wherever they occur, Figure 1 is a top plan view;

Fig. 2 is a side elevation (partly in section); and

Fig. 3 is a fragmentary sectional view through an airbag or tube.

The airbag or tire-tube 1 may be of any ordinary or desired construction. So may, also, the air valve 2. The head 3 bears against one side of pad 4, which fits in groove 5 in the threaded stem of air valve 2.

The pad 4 is preferably constructed of a plurality of layers or plies 6, 7, 8, 9, 10.

Heretofore, in using a semi-plastic tube or bag 1, with air pressure within the same as a form for forming or curing tires or other tubes or when curing such a tire or bag with contained air pressure, it has been found that air valve 2 will frequently be pulled through plies 6, 7, 8, and 9, due to their plasticity. It has been the practice to make them of plastic or semi-plastic rubber, in order that in the process of vulcanization or curing they can unite readily with the wall of tube 1. Because of such pulling through, the number of such plies has gradually been increased by manufacturers until the use of plastic or semi-plastic plies 6, 7, 8, and 9 is now common, but without noticeable diminution of the objectionable pulling through of head 3 of valve 2. Such pulling through causes great loss to tire manufacturers.

According to the present invention, ply or layer 10 is of cured or vulcanized rubber, and the objectionable pulling through the pad 4 and tube 1 of head 3 is thereby entirely eliminated or obviated, resulting in great saving in the cost of manufacture. Furthermore, the number of other plies in pad 4 can be reduced.

The inside of ply 10 is roughened (as indicated in Fig. 1), and when heat is applied the rubber of the other plies in pad 4 and of tube 1 flows into such roughness and amalgamates therewith in as tight union as is necessary.

Having thus described this invention, I hereby reserve the benefit of all changes in form, arrangement, order, or use of parts, as it is evident that many minor changes may be made therein without departing from the spirit of this invention or the scope of the following claims.

I claim:

1. A valve-retaining pad comprising a plurality of plies, one of which is of cured rubber, the inside of which is roughened.

2. A valve-retaining pad comprising a plurality of plies, one of which is of cured rubber, the inside of which is roughened, and the rest of the said pad being of rubber of such consistency as to be adapted under the application of heat to amalgamate with such roughness.

In testimony whereof I hereunto affix my signature.

ANDREW T. PICKENS.